Sept. 17, 1963   M. E. ERICKSON   3,104,000
AIR ACTUATED CLUTCH
Filed June 24, 1960

INVENTOR;
MILTON E. ERICKSON.

BY *Robert M. Dunning*

ATTORNEY

United States Patent Office 3,104,000
Patented Sept. 17, 1963

3,104,000
AIR ACTUATED CLUTCH
Milton E. Erickson, Minneapolis, Minn., assignor to Horton Mfg. Co., Inc., Minneapolis, Minn., a corporation of Minnesota
Filed June 24, 1960, Ser. No. 38,642
1 Claim. (Cl. 192—85)

This invention relates to an improvement in air actuated clutches and deals particularly with a fluid actuated clutch which requires no rotary seal in its operation.

Various types of rotary clutches have been produced for one purpose or another. Certain of said constructions include a rotatable member which is secured to a shaft, and a second relatively rotatable member adjoining the first member. Hydraulic or pneumatic means have sometimes been provided for urging the relatively rotatable member against the first member so that the two members will rotate in unison. Most such clutches require the use of a rotary seal to prevent the escape of the fluid. It is the object of the present invention to provide an air actuated clutch which requires no such seal.

A feature of the present invention resides in the provision of a clutch including a clutch disc having a ring shaped friction surface which is keyed to a shaft for rotation therewith. A pulley or other relatively rotatable member is slidably supported upon the shaft for movement toward or away from the friction surface. Resilient means is provided for normally urging the two members apart. A housing is supported by the shaft and which is normally held from rotation. This housing incorporates a novel type of expansion chamber permitting the housing to expand axially of the shaft. Expansion of the housing creates a force against the relatively rotatable driven member to urge the same against the friction surface.

These and other objects and novel features of the present invention will be more clearly and fully set forth in the following specification and claim.

In the drawings forming a part of the specification:

Figure 2:
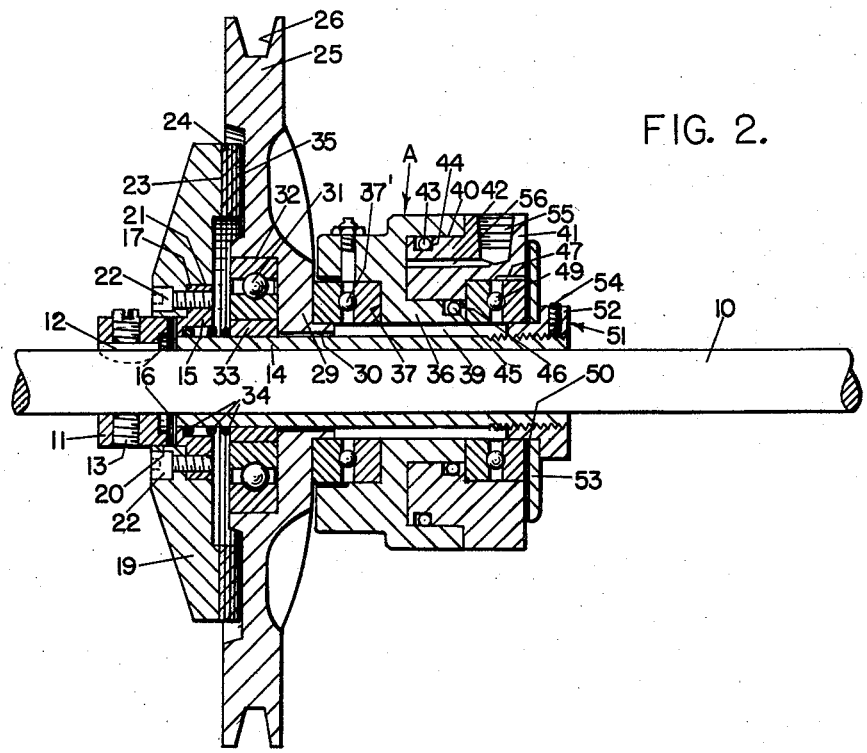
FIGURE 2 is a sectional view through the clutch showing the construction thereof.
Figure 1:
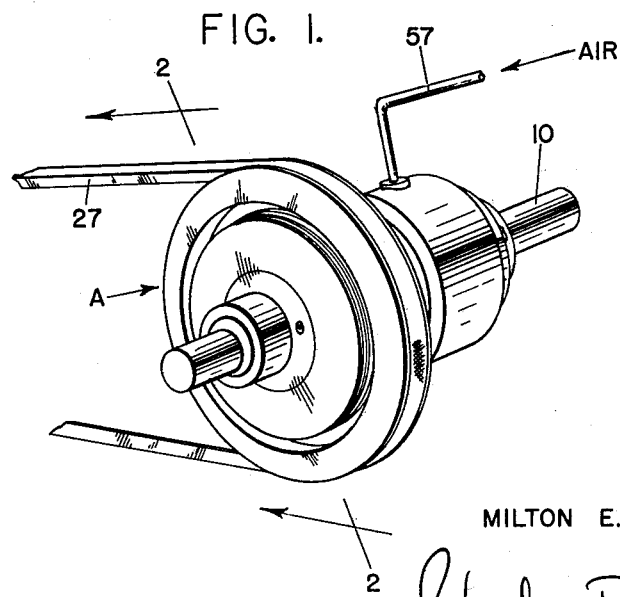
FIGURE 1 is a perspective view of the pulley in operation.

The air clutch is indicated in general by the letter A, and is supported upon a rotatable shaft pin. A hub 11 is mounted upon the shaft 10 and is held in rotation relative to the shaft by a key 12 or other suitable means. Set screws 13 or other suitable means may also be provided for holding the hub from axial movement upon the shaft.

An elongated sleeve 14 is mounted on the shaft adjacent to the hub 11. The hub 11 is provided with a hollow cylindrical extension 15 which overlies one end of the sleeve 14. Pins 16 or other suitable means extend through the hub portion 15 and into the sleeve 14 for holding the sleeve from rotation upon the shaft 10. The hollow cylindrical extension 15 is provided with a peripheral ring shaped flange 17 at its extremity.

A friction disc 19 is provided with a central aperture 20 designed to accommodate the hub 11, the disc including a ring-shaped groove 21 designed to accommodate the flange 17. The disc 19 is bolted to the flange 17 by bolts or similar fastening means 22. The disc 19 is provided with an axially extending ring shaped flange 23 at its outer periphery which supports a ring 24 of friction material similar to brake lining or the like.

A relatively rotatable member is slidably supported encircling the sleeve 14. In the particular arrangement illustrated, this comprises a pulley 25 having a pulley groove 26 designed to accommodate a belt 27. The pulley 26 is provided with a hub 29 having an aperture 30 therethrough of sufficient size to freely encircle the sleeve 14. A ball bearing 31 has its outer race mounted in a cylindrical cavity 32 while the inner race of the bearing 31 is supported upon a bushing 33 encircling the sleeve 14. The bushing 33 is slidable on the outer surface of the sleeve 14 and a spiral spring 34 is interposed between a portion of the hub 11 and the bushing 33 to urge the friction disc 19 and pulley 25 apart. The pulley 25 is provided with a flat side wall portion 35 against which the friction ring 24 may engage.

A two-part expandable housing also encircles the sleeve 14. The housing includes a ring shaped portion 36 having a central aperture 37 therethrough to freely encircle the sleeve 14. A thrust bearing 37' is enclosed in the hollow cavity 39 at one end of the housing portion 36. The inner race of the thrust bearing 37 is held from rotation relative to the housing portion 36 while the outer race of the bearing is supported by the pulley hub 29 for rotation in unison therewith. The housing portion 36 also includes a ring-shaped cavity 40 which is concentric with the axis of the housing and which is in the end of the housing portion most remote from the pulley 25.

The housing also includes a second housing portion 41 which also freely encircles the sleeve 14 and which is provided with a hollow cylindrical projection 42 which fits snugly into the cylindrical groove 40. A sealing ring 43 is provided in a groove 44 in the outer periphery of the cylindrical projection 42 and a second sealing ring 45 is provided in a peripheral groove 46 in the inner wall of the groove 40. The rings 43 and 45 act as sealing rings to prevent the escape of air between the ring-shaped projection 42 and the walls of the groove 40 in which the projection slides.

The housing portion 41 is provided with a cylindrical recess 47 in the end of the housing portion most remote from the cylindrical projection and the recess 47 accommodates a ball bearing 49. The inner race of the bearing 49 is seated with respect to the housing portion 41 while the outer race is supported by the cylindrical flange 50 of an angular retaining nut 51 which is threaded on the end of the sleeve 14. The peripheral flange 52 of the nut 51 also engages a retaining washer 53 which also engages the outer race of the bearing 49, and the nut 51 is anchored in place by set screw 54.

An air inlet port 55 extends into the housing member 41 and is connected by one or more passages 56 to the the end of the cylindrical projection 42 and into the base of the cylindrical groove 40. Fluid under pressure may be forced through the passage 56 from a conduit 57 connected to a source of supply of air under pressure or to any suitable source of fluid supply.

The two portions 36 and 41 of the housing are normally held from rotation in any suitable means, the supporting bearings 37 and 49 permitting the housing to remain stationary during rotation of the shaft 10. The spring 34 normally holds the pulley 25 spaced from the friction surface 34 of the friction disc 19, and under these conditions, the pulley 25 may normally remain stationary during rotation of the shaft 10.

When fluid under pressure is introduced into the base of the cylindrical groove 40, the two portions of the housing are forced apart. The housing portion 41 is held from axial movement by the retaining nut 51 so that the pressure at the base of the groove 40 acts to force the housing portion 36 to the left as viewed in FIGURE 2. This movement is transmitted through the ball bearing 37 to the pulley 25 which acts to contract the spring 34. This causes the surface 35 of the pulley 25 to engage the friction surface 24 of the friction disc 19, causing the pulley to rotate with the shaft. Whether or not the pulley travels at the same speed as the shaft depends upon the force acting against the pulley which controls any slippage between the pulley and the friction disc.

In accordance with the patent statutes, I have described the principles of construction and operation of my improvement in air actuated clutch, and while I have endeavored to set forth the best embodiment thereof, I desire to have it understood that changes may be made within the scope of the following claim without departing from the spirit of my invention.

I claim:

A fluid clutch including a shaft, a hub mounted on said shaft for rotation in unison therewith, a friction disk concentric with said shaft and supported by said hub for rotation therewith, a sleeve encircling said shaft adjoining said hub, being secured thereto and held from rotation relative thereto, a bushing encircling said sleeve and slidable relative thereto adjoining said hub, a bearing encircling said bushing adjoining said friction disk, a relatively rotatable member supported by said bearing adjoining said friction disk, and including a friction surface in opposed relation to said friction disk, a friction ring interposed between the opposed surfaces of said friction disk and rotatable member and secured to one of these surfaces, said relatively rotatable member including a rotatable hub extending into close proximity to said sleeve and against which the end of said bushing most remote from said first named hub is engaged, a spring encircling said sleeve and interposed between said first named hub and said bushing to urge said rotatable member away from said friction disk, a two part expandable housing encircling said sleeve and concentric therewith, a pair of spaced thrust bearings supporting said two part housing, one thrust bearing being supported by said rotatable hub and the other thrust bearing being supported by a retaining nut attached to the end of the sleeve most remote from said first mentioned hub, said two part expandable housing including one part having a ring-shaped cavity having cylindrical inner and outer walls concentric with said shaft, and the other part including a ring-shaped projection having cylindrical inner and outer walls slidably engaged with the cavity walls, and said housing having a fluid passage therein communicating with the base of the cavity, whereby fluid under pressure may be introduced into the base of the cavity to expand the housing and to urge said rotatable member against said friction disk.

References Cited in the file of this patent

UNITED STATES PATENTS

| | | |
|---|---|---|
| 1,611,545 | Maybach | Dec. 21, 1926 |
| 2,587,230 | Schaad | Feb. 26, 1952 |
| 2,682,892 | Picard | July 6, 1954 |
| 2,868,027 | Oberholtz et al. | Jan. 13, 1959 |

FOREIGN PATENTS

| | | |
|---|---|---|
| 17,167 | Great Britain | of 1911 |